US008223685B2

(12) United States Patent
Baglin et al.

(10) Patent No.: US 8,223,685 B2
(45) Date of Patent: Jul. 17, 2012

(54) METHOD OF SELECTING A COMMUNICATION SYSTEM FOR OPERATING WITH A COMMUNICATION DEVICE IN AN IDLE MODE, AND COMMUNICATION DEVICE

(75) Inventors: Matthieu Baglin, Toulouse (FR); Stephane Bausson, Lherm (FR); Satish Jamadagni Najunda Swamy, Bangalore (IN)

(73) Assignee: Motorola Mobility, Inc., Libertyville, IL (US)

( * ) Notice: Subject to any disclaimer, the term of this patent is extended or adjusted under 35 U.S.C. 154(b) by 724 days.

(21) Appl. No.: 12/431,415

(22) Filed: Apr. 28, 2009

(65) Prior Publication Data
US 2009/0268654 A1 Oct. 29, 2009

(30) Foreign Application Priority Data
Apr. 28, 2008 (EP) .................................. 08008097

(51) Int. Cl.
*H04B 7/185* (2006.01)
(52) U.S. Cl. ......... 370/318; 370/311; 370/328; 370/338
(58) Field of Classification Search .................. 370/311, 370/318, 328, 338
See application file for complete search history.

(56) References Cited

U.S. PATENT DOCUMENTS

| 6,058,289 | A  | * | 5/2000  | Gardner et al. .............. 340/7.32 |
| 6,731,931 | B1 | * | 5/2004  | Grayson et al. ............... 455/430 |
| 6,741,841 | B1 | * | 5/2004  | Mitchell .................... 455/188.1 |
| 6,799,030 | B2 | * | 9/2004  | Barber et al. ............... 455/343.1 |
| 7,110,765 | B2 |   | 9/2006  | Amerga et al. |
| 7,133,702 | B2 |   | 11/2006 | Amerga et al. |
| 7,630,735 | B2 | * | 12/2009 | Lin et al. .................... 455/552.1 |
| 2002/0197992 | A1 |  | 12/2002 | Nizri et al. |
| 2003/0119527 | A1 |  | 6/2003  | Labun et al. |
| 2004/0012178 | A1 |  | 1/2004  | Wisniewski |
| 2004/0205158 | A1 |  | 10/2004 | Hsu |
| 2007/0032265 | A1 | * | 2/2007  | Park .......................... 455/552.1 |
| 2007/0060095 | A1 |  | 3/2007  | Subrahmanya et al. |

FOREIGN PATENT DOCUMENTS

| AE | 0896493 A2 | 2/1999 |
| EP | 0896493 A2 | 2/1999 |
| WO | 2006096295 A1 | 9/2006 |
| WO | 2007065329 A1 | 6/2007 |

OTHER PUBLICATIONS

PCT Search Report; PCT Application No. PCT/US2009/039989, corresponding Motorola; Oct. 20, 2009; 11 pages.

(Continued)

*Primary Examiner* — Ricky Ngo
*Assistant Examiner* — Dewanda Samuel
(74) *Attorney, Agent, or Firm* — Gary J. Cunningham

(57) ABSTRACT

A method of selecting a communication system (2, 4) for operating with a communication device (100) during an idle mode of operation of the communication device is described. The communication device (100) is capable of operating with at least two communication systems. The method comprises determining (302, 304, 306) the one communication system of the at least two communication systems (2, 4) with which the communication device (100) has a smallest power consumption when operating in the idle mode of operation, and selecting the determined one communication system for operation with the communication device during the idle mode of operation.

16 Claims, 3 Drawing Sheets

OTHER PUBLICATIONS

Xing et al; "Multi-Constraint Dynamic Access Selection in Always Best Connected Networks"; Donald Bren School of Information and Computer Sciences, University of California; Irvine, CA; 9 pages.

Energy Consumption Measurement of Wireless Interfaces in Multi-Service User Terminals for Heterogeneous Wireless Networks; IEICE Trans. Commun., vol. E88-B, No. 3 Mar. 2005; XP001225587.

* cited by examiner

METHOD OF SELECTING A COMMUNICATION SYSTEM FOR OPERATING WITH A COMMUNICATION DEVICE IN AN IDLE MODE, AND COMMUNICATION DEVICE

FIELD OF THE INVENTION

This invention relates to a method of selecting a communication system for operating with a communication device during an idle mode of operation, and a communication device.

BACKGROUND OF THE INVENTION

There is increasing demand for individual wireless communication devices that are operable with more than one communication system, each having a different Radio Access Technology (RAT). This may be desirable in applications where the alternative systems available have different features and can provide different services. For example, in order to deliver high performance, low-cost mobile voice and data services to mobile subscribers at home and/or the office, in addition to the typical mobile services, dual mode communication devices have been developed that are operable on a cellular communication system, such as a second generation (2G) system like the Global System for Mobile communication (GSM), or a third generation system, like the Universal Mobile Telecommunication System (UMTS) or other systems based on Wideband Code Division Multiple Access (WCDMA) technology, and an Unlicensed Mobile Access (UMA) communication system such as a Wi-Fi system. UMA or Global Access Netork (GAN) is a Fixed/Mobile Convergence standard (FMC) part of a 3rd Generation Partnership Project (3GPP) for subscriber access to mobile circuit, packet and IMS-based services over any IP based access network, including the internet. In another example, it may be desirable for cellular communication devices to be operable with two or more of 2G, 3G and 4G communication systems.

Typically, multi-mode devices that are capable of operating with multiple communication systems will have a preferred communication system out of the multiple communication systems. The preferred communication system is determined according parameters such as what services are available on the communication systems, cost of services, Quality of Service (QoS), network identification and potentially user preference. If the quality of communication provided by the preferred communication system is poor and below a predetermined threshold, then a handover or reselection will be triggered and the communication device will switch to another communication system with better quality.

The wireless communication device may operate in one of several modes. In an idle mode, the communication device is registered with a communication system, which will normally be its preferred communication system unless the quality of communication is poor, and will receive signalling information, such as paging messages on a paging channel, from the communication system but there will be no Circuit Switch (CS) or Packet Switch (PS) connection for communicating traffic information such as in a voice or data call. In an active mode, communication resources will be allocated to the wireless communication device and there will be a Circuit Switch (CS) or Packet Switch (PS) connection for a voice or data call.

With battery powered communication devices, there is always a need to reduce power consumption in the devices so as to increase battery life. As is well known, in 2G and 3G systems, in order to improve battery life, when the communication device is not in an active mode of operation (i.e. not transmitting or receiving traffic information, such as SMS, video, multimedia or voice data in a voice or data call), the wireless communication device enters an idle mode of operation in which some of the components of the communication device, such as the RF reception block, are powered off to save power. This is known as the discontinuous reception (DRX) mode. In the DRX mode, the components of the communication device that are required to monitor the signalling signals from the communication system(s) will still consume power but this is small compared to the consumption in the active mode.

Other techniques have been proposed for limiting power consumption in the idle mode. For example, U.S. Pat. No. 7,133,702 and PCT application no. WO 2004/021731 describe techniques for limiting cell reselection in idle mode so as to reduce power consumption. PCT application no. WO 2007/035737 describes a technique for quick detection of signalling when decoding a paging channel in order to reduce power consumption in the idle mode.

For a multi-mode communication device operating in the idle mode, the power consumption in the device can be greater on some communication systems than on others. For example, for a communication device in idle mode, the power consumption in the device is greater when the device is operating with a Wi-Fi communication system than it is when the device is operating with a GSM communication system since the Wi-Fi system does not use a DRX mode which is as efficient in saving power as the DRX mode used on GSM or UMTS. For example, the current drain (which is equivalent to power consumption) of a wireless communication device operating in idle mode on a Wi-Fi communication system is between 6-10 mA whereas the current drain of a wireless communication device operating in idle mode on GSM communication system is between 1-3 mA depending on the DRX mode.

Thus, the power consumption of a multi-mode communication device operating in the idle mode will depend on what communication system has been selected to be its preferred communication system.

For a multi-mode communication device operating in an active mode, the differences in power consumption between the different communication systems are less significant and depend more on the quality of the link between the communication device and the communication system.

In order to increase battery life in a multi-mode communication device, it would be desirable to reduce power consumption in the communication device when it is operating in idle mode.

SUMMARY OF THE INVENTION

In accordance with the present invention there is provided a method of selecting a communication system for operating with a communication device, and a communication device as recited in the accompanying claims.

BRIEF DESCRIPTION OF THE DRAWINGS

A method of selecting a communication system for operating with a communication device in accordance with the disclosure, and a communication device in accordance with the disclosure will now be described, by way of example only, with reference to the accompanying drawings in which.

DETAILED DESCRIPTION OF THE DRAWINGS

The present disclosure will be described with reference to a dual mode communication device capable of operating with the GSM and Wi-Fi communication systems. It will however be appreciated that the present disclosure may apply to multi-mode communication devices capable of operating with any combination of two or more different communication systems, which may be selected from, for example: Private Mobile Radio (PMR); GSM; Enhanced Data rates for GSM Evolution (EDGE); General Packet Radio System (GPRS); WCDMA or Universal Mobile Telecommunications System (UMTS); Third Generation Long Term Evolution (LTE); Wireless Local Area Networks (WLAN); Worldwide Interoperability for Microwave Access (WIMAX); Wi-Fi; Bluetooth; or the like.

Figure 1:
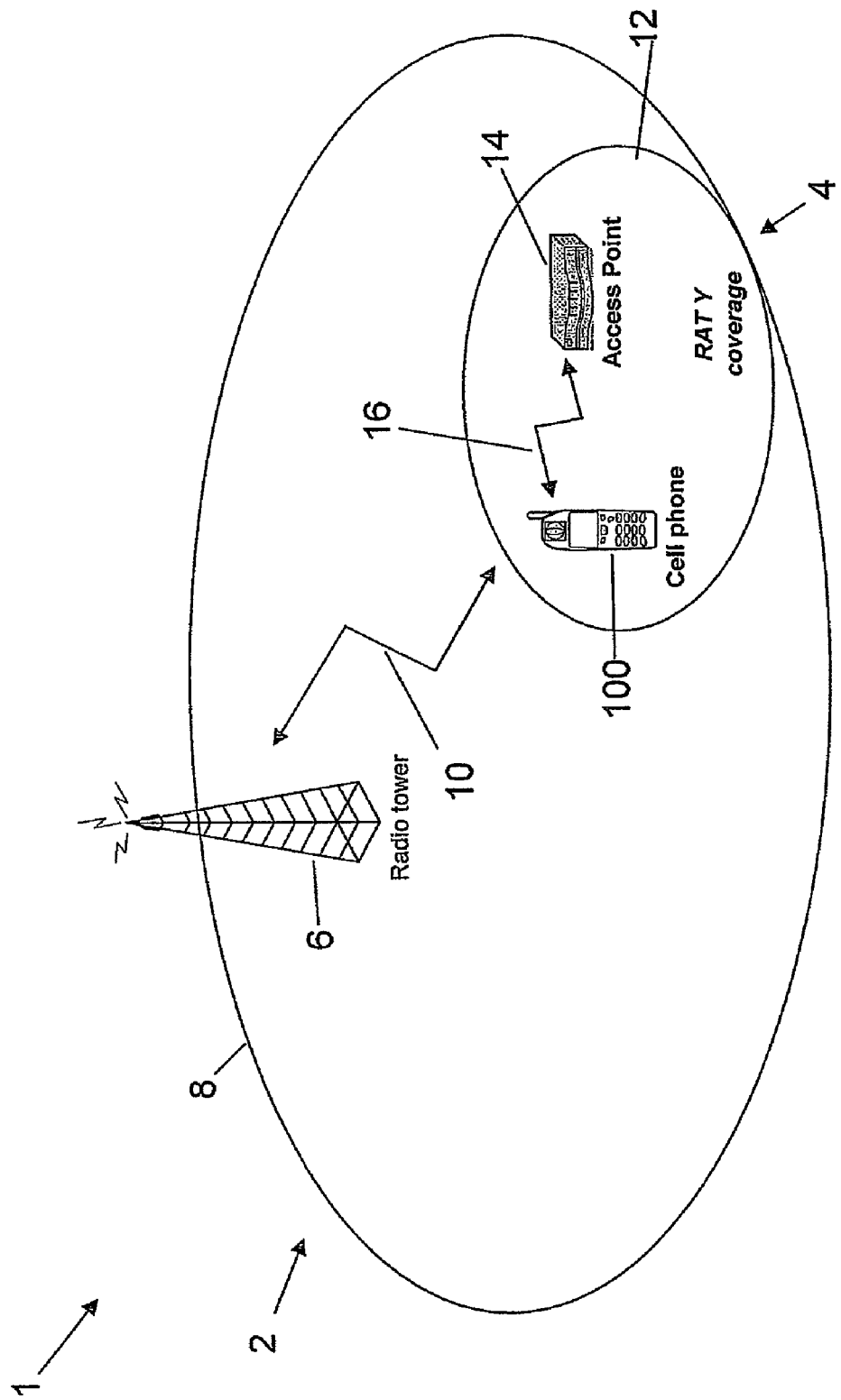
FIG. 1 is a block schematic diagram of a wireless communication system in accordance with an embodiment of the disclosure.

Referring firstly to FIG. 1, a communication system arrangement 1 comprises a plurality of communication devices, only one 100 of which is shown, capable of operating with a GSM communication system 2 and a Wi-Fi communication system 4. The GSM communication system 2 provides a coverage area or cell 8 served by a base station (BS) 6. The communication device 100 can operate or communicate with the GSM communication system 2 via radio communication link 10. The Wi-Fi communication system 4 provides a coverage area 12 served by access point 14. The communication device 100 can operate or communicate with the Wi-Fi communication system 4 via radio communication link 16. It will be appreciated that although only one base station 6 and cell 8 have been shown, the GSM communication system 2 has a plurality of cells and each cell is served by one or more base stations. In addition, the Wi-Fi communication system 4 may have a plurality of access points and may be part of a larger UMA communication system.

Figure 2:
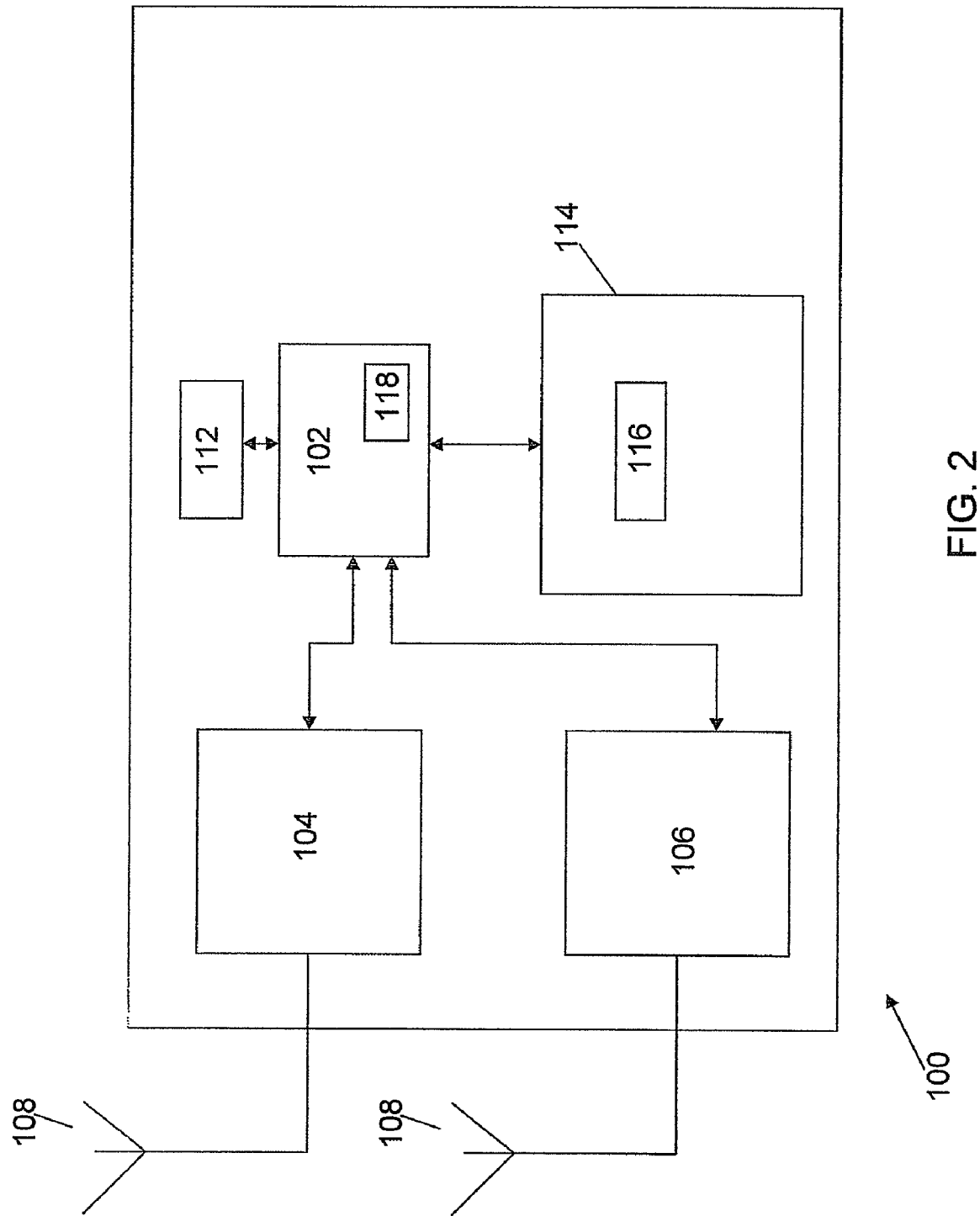
FIG. 2 is a block schematic diagram of a communication device in accordance with an embodiment of the disclosure.

FIG. 2 is a block diagram of a communication device, such as the communication device 100 shown in FIG. 1, in accordance with an embodiment of the disclosure. The communication device 100 may be a portable or mobile telephone, a Personal Digital Assistant (PDA), a wireless video or multimedia device, a portable computer, an embedded communication processor or similar wireless communication device. In the following description, reference is made to a communication device comprising a Mobile Station (MS). As will be apparent to a skilled person, FIG. 2 shows only the main functional components of an exemplary MS 100 that are necessary for an understanding of the invention.

The MS 100 comprises a processing unit 102 for carrying out operational processing for the MS 100. The MS 100 also has a first communication section 104 for providing wireless communication via a radio communication link with the base station 6 of the GSM communication system 2 and a second communication section 106 for providing wireless communication via a radio communication link with a Wi-Fi access point 14 of the Wi-Fi communication system 4. Each of the communication sections 104 and 106 typically includes an antenna 108, 110, a modulation/demodulation section (not shown), and a coding/decoding section (not shown), for example, as will be known to a skilled person and thus will not be described further herein. The communication sections 104, 106 are coupled to the processing unit 102. In an alternative arrangement not described herein, the MS 2 may comprise a single RF communication section which is programmable to switch operation between the different communication systems and a single antenna.

The MS 100 also has a Man Machine Interface MMI 112, including elements such as a key pad, microphone, speaker, display screen, for providing an interface between the MS and the user of the MS. The MMI 112 is also coupled to the processing unit 102.

The processing unit 102 may be a single processor or may comprise two or more processors carrying out all processing required for the operation of the MS 100. The number of processors and the allocation of processing functions to the processing unit is a matter of design choice for a skilled person. The MS 100 also has a program memory 114 in which is stored programs containing processor instructions for operation of the MS 100. The programs may contain a number of different program elements or sub-routines containing processor instructions for a variety of different tasks, for example, for: communicating with the user via the MMI 112; and processing signalling messages (e.g. paging signals) received from the communication systems 2 and 4. Specific program elements stored in program memory 114 include a communication system select element 116 for selecting one of the communication systems 2, 4 for operating with the MS 100. The operation of the communication system select element 116 will be described in more detail below.

The MS 100, once turned on, may be in one of several operating modes in relation to the communication systems 2,4, such as idle mode, or active mode. In the idle mode, the MS 100 is active with (that is, registered to) one of the communication systems but no communication resources have been allocated to the MS 100. In other words, there is no CS or PS connection between the MS 100 and the communication system so that the MS 100 will not receive or transmit traffic information, such as SMS, video, multimedia or voice data in a voice or data call. In the idle mode, the communication system 2, 4, with which the MS 100 is active, communicates with the MS 100 by sending signalling information, such as paging signals or blocks to the MS 100 and the MS 100 is arranged to monitor for such signalling information from the communication system. The signalling information includes, for example, information that alerts the MS 100 to an incoming call, or information that provides system parameters to the communication device for determining the operation of the device when operating with the communication system.

In the active mode, communication resources are allocated to the MS 100 and a CS or PS connection is established between the MS 100 and the active communication system which allows for the MS 100 to transmit or receive traffic information in a data or voice call.

As discussed in the introduction, a preferred communication system out of the GSM communication system 2 and Wi-Fi communication system 4 will have been selected (for example, by the user of the MS 100) and the MS 100 will first register with or become active with the preferred communication system unless the quality of the communication with the preferred communication system is below a threshold at which point the MS 100 will switch to a communication system providing better quality communication. In the example of a dual mode MS capable of operating with a GSM communication system 2 and a Wi-Fi communication system 4, typically the Wi-Fi communication system 4 will be the preferred system in view of the cost savings that are available by making voice and data calls over the Wi-Fi communication system 4 compared to the GSM communication system 2.

Thus, in an embodiment in which the Wi-Fi communication system is the preferred system for a user of the MS 100, the Wi-Fi communication system 4 will be selected first as the active communication system and the GSM communication system 2 will be the 'passive' communication system. So the MS 100 will first use the Wi-Fi communication system 4 to make voice and data calls when operating in the active mode and will also first operate with the Wi-Fi communication system 4 for monitoring for signalling signals when operating in the idle mode, unless the quality of communication provided by the Wi-Fi communication system is less than a certain threshold. For a Wi-Fi communication system the quality of communication is determined by the power of the signals sent over the communication link 16. As the MS 100 moves further away from the access point 14, the power decreases and the communication quality decreases. If the communication quality reaches the threshold then a handover is triggered to the GSM communication system 2, which then becomes the active communication system and the Wi-Fi communication system 4 becomes the passive communication system.

As discussed in the introduction, different communication systems require the MS 100 in idle mode to operate in different ways and thus, the power consumption of the MS 100 is different for the different communication systems. For example, a MS operating with a Wi-Fi communication system will consume more power when operating in idle mode compared to when the MS operates with a GSM communication system in idle mode. Even different modes of operation within the same communication system can require the MS 100 to operate in different ways and so consume different amounts of power. For example, the GSM communication system defines a discontinuous reception (DRX) mode for a MS operating in idle mode in order to reduce power consumption in the MS 100 when no radio resources have been allocated to the MS 100. In DRX mode, the MS 100 listens to or monitors only specific one or more paging blocks allocated to the MS 100 and at other times inactivates certain elements, such as the communication section 104, in order to reduce power consumption and conserve battery life. The GSM communication system 2 knows which listens to which paging blocks and so can communicate with any MS if necessary via the paging blocks.

The GSM standard defines different DRX modes, such as the DRX2 mode and the DRX9 mode. In the DRX2 mode, more paging blocks are allocated to the MS 100 than compared to the DRX9 mode. Thus, if the GSM communication system 2 specifies in the signalling messages sent to the MS 100 that the MS should operate in the DRX2 mode when operating in the idle mode, the MS 100 will have to monitor for more paging blocks than in the DRX9 mode and so will consume more power.

Power consumption in the MS 100 when operating in the active mode, is substantially the same across the different communication systems.

In order to minimise power consumption in a multi-mode MS when operating in idle mode, the MS in accordance with an embodiment of the present invention is arranged to select as an active communication system with which the MS operates in idle mode, the communication system which requires least power consumption in the MS during the idle mode. In the example described above, the GSM communication system 2 requires the least power consumption compared to the Wi-Fi communication system 4 and thus, when the MS enters the idle mode, the MS 100 selects the GSM communication system 2 as the active communication system and establishes communication between the MS 100 and the GSM communication system 2 even though the Wi-Fi communication system 4 is the preferred communication system. The Wi-Fi communication system 4 is the passive communication system and the MS 100 is arranged to switch to the Wi-Fi communication system 4 when the MS enters an active mode and a data or voice call is to be made. The registration of the MS 100 on the passive Wi-Fi communication system 4 is fast enough (typically around 3 seconds) so that the end user is not aware of the change in RAT.

Figure 3:
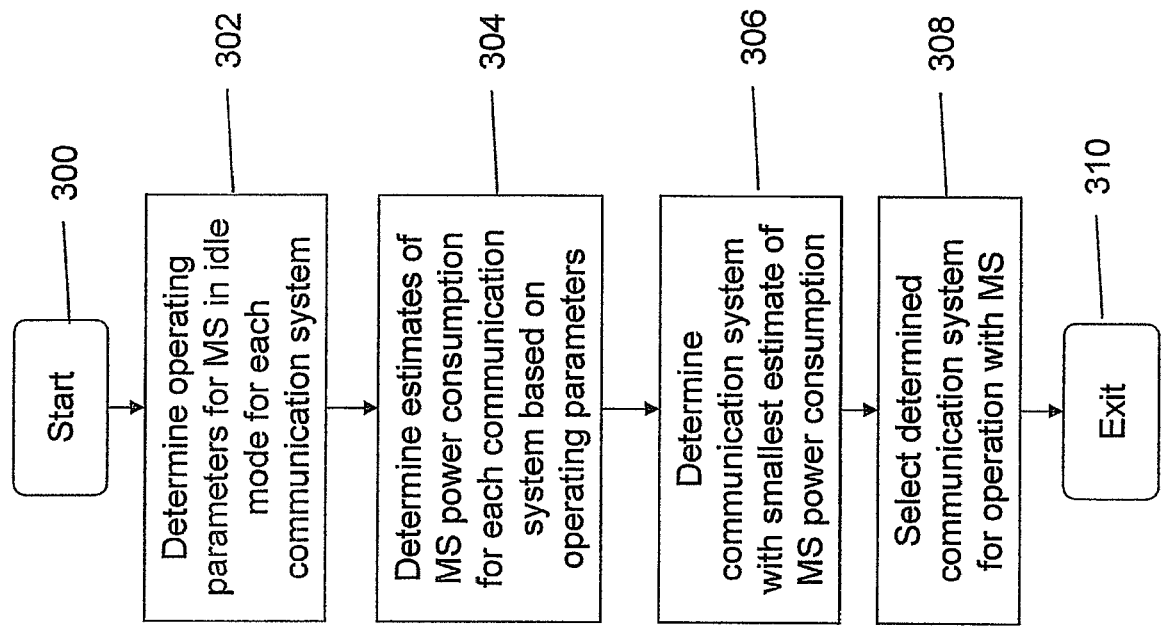
FIG. 3 is a schematic flow diagram showing the method of selecting a communication system for the communication device of FIG. 2 in accordance with an embodiment of the disclosure.

A method of selecting a communication system for operating with the MS 100 in accordance with an embodiment of the disclosure will now be described with additional reference to FIG. 3.

The process starts at step 300 when the MS 100 enters the idle mode of operation, for example after a voice or data call has ended. Under the control of the communication system select element 116, the MS 100 determines the power consumption which will be required by the MS 100 operating in idle mode for each one of the communication systems which are available, and determines which one of the communication systems has the smallest power consumption, steps 302-306. A communication system is available to the MS 100 when the MS 100 is capable of establishing communication with that communication system.

The power consumption for each of the communication systems will depend on operating parameters for the communication system, which operating parameters define the operation of the MS 100 with the communication system during the idle mode. The operating parameters include device parameters which correspond to the configuration of the MS 100 during the idle mode and may also include system parameters sent by the communication systems in signalling information. The device parameters may depend on the hardware components of the MS 100, such as the speed of the PLL circuit in the communication sections, or the software configuration of the MS 100, such as the background scan preference settings. The system parameters determine how the MS 100 should operate to communicate with the communication system in the idle mode e.g. for the GSM communication system 2, for example, the signalling information will indicate whether the MS 100 should operate in DRX2 or DRX9 mode.

In an embodiment, a look-up table is generated and stored in memory 118 in the MS 100. The loop-up table includes estimates of power consumption for the MS 100 for each of the communication systems for the different operating parameters. For the example shown in FIG. 1, the look-up table will hold estimate of power consumption for a Wi-Fi communication system 2 and estimates of power consumption for the GSM communication system 2 for different system parameters. For example, the look-up table will include an estimate of power consumption for DRX2 mode and DRX9 mode. The power consumption measurements for the different communication systems and different operating parameters may be performed in the factory and the look-up table will then be loaded into the processing unit 102 at the time of manufacture of the MS 100. The memory 118 is shown in FIG. 2 as being part of the processing unit 102 but may instead be separate to the processing unit 102.

For some communication systems, such as a Wi-Fi communication system, the power consumption depends mainly on the hardware configuration of the MS 100 (that is, the device parameters) and does not vary much with the system parameters. In other words, the power consumption only varies with the device parameters and not the system parameters.

Thus, in order to determine the power consumption for each of the available communication systems, the operating parameters of the MS 100 for each communication system are first determined from the system parameters received from the signalling information and the device parameters, step 302, and then using the look-up table, estimates of the power consumption for each of the communication systems based on the determined operating parameters is determined, step 304.

At step 306, the communication system having the smallest estimate of power consumption is determined.

The MS 100 then selects, under the control of the communication system select element 116, the determined communication system having the smallest power consumption for operation during the idle mode, step 308. This may include registering with the determined communication system if a reselection has to be performed or if already registered with the determined communication system, receiving signalling information. For example, if the MS 100 is communicating with the Wi-Fi communication system 4 since this is the preferred system, and the GSM communication system 2 is determined to require the smallest power consumption in idle mode, a reselection is triggered from the Wi-Fi communication system 4 to the GSM communication system 2 which involves the MS 100 establishing communication with the GSM communication system 2 to register the MS 100. The MS 100 will remain in communication with the determined communication system, e.g. the GSM communication system 2, until the MS 100 next enters the active mode in order to make or receive a voice or data call at which point the MS 100 will exit the idle mode, step 310 or until a new communication system becomes available. When a new communication system becomes available to the MS 100 for communication with the MS 100, the MS 100 determines whether the newly available communication system has the smallest power consumption compared to the other available communication systems by repeating the steps 302 to 308.

On initiation of a voice or data call to be terminated at the MS 100, the MS 100, which is operating in idle mode with the GSM communication system 2, receives signalling information from the GSM communication system 2 indicating the call set-up system parameters for the GSM communication system and the call is taken on the GSM communication system and then a handover is triggered to the Wi-Fi communication system as the preferred communication system once the call has been established.

Alternatively, on initiation of a voice or data call to be terminated at the MS 100, the MS 100, which is operating in idle mode with the GSM communication system 2, receives signalling information from the GSM communication system 2 for call set-up and when the MS 100 responds to the GSM communication system 2, the GSM communication system 2 notifies the MS 100 of the new assignment parameters to the preferred Wi-Fi communication system 4. The MS 100 then registers with the preferred Wi-Fi communication system 4 and the call is communicated over the Wi-Fi communication system. 4

Once the MS 100 has registered with a communication system and so that system becomes the active communication system in the idle mode of operation, the MS 100 can still monitor for signalling information from a passive communication system. When the MS 100 is operating with the GSM communication system 2, the MS 100 may still do a Wi-Fi background scan in order to identify an appropriate access point so that when the MS 100 needs to make or receive a voice or data call, the MS 100 has already identified an appropriate access point. If the background scan is not performed during the idle mode, it will take longer to make a call on the Wi-Fi communication system 4 since a scan would have to be made to locate an access point. In order to minimise power consumption, the background scan could be performed at a higher rate than normal.

In summary, by selecting a communication system which requires the smallest power consumption in the MS during an idle mode of operation, the method in accordance with an embodiment of the present disclosure can keep the power consumption in the MS to a minimum. This improves the battery life of the communication device.

For the examples given above wherein the current drain of a wireless communication device operating in idle mode on a Wi-Fi communication system is between 6-10 mA whereas the current drain of a wireless communication device operating in idle mode on GSM communication system is between 1-3 mA depending on the DRX mode, by selecting the GSM communication system for the idle mode as opposed to the Wi-Fi communication system which would normally be selected as the preferred system, the method in accordance with the present invention can save up to 3 times the power consumption.

Moreover, in the existing UMA specification, a switch to UMA is forced whenever a UMA cell (e.g. an access point) is found, there may be unwanted registration and deregistration in case of a relatively weak UMA signal—which has a high possibility as the UMA spectrum is unlicensed. With the present disclosure, the MS in idle mode registers with the communication system requiring the smallest power consumption and UMA registration is made just before or just after a mobile originated call. By avoiding unwanted UMA registration/deregistration, the power consumption in the MS will be decreased and so will provide greater battery life for the end user. Of course the same is true with Wi-Max and any other RATs which coexist with GSM or UMTS.

The invention claimed is:

1. A method of selecting a communication system for operating with a communication device during an idle mode of operation of the communication device, the communication device being capable of operating with at least two communication systems, the method comprising:
   determining the one communication system of the at least two communication systems with which the communication device has a smallest power consumption when operating in the idle mode of operation, by:
      determining operating parameters for each of the at least two communication systems, the operating parameters defining operation of the communication device with each of the at least two communication systems during the idle mode of operation;
      determining estimates of power consumption of the communication device when operating with each of the at least two communication systems during the idle mode of operation based on the determined operating parameters; and
      determining the communication system for which the determined estimate of power consumption of the communication device is the smallest; and
   selecting the determined one communication system for operation with the communication device during the idle mode of operation.

2. The method according to claim 1, further comprising registering the communication device with the determined communication system.

3. The method according to claim 1, further comprising receiving signalling information from the determined communication system.

4. The method of claim 1, wherein the operating parameters include system parameters received by the communication device from the at least two communication systems.

5. The method of claim 1, wherein the operating parameters further include device parameters corresponding to a configuration of the communication device.

6. The method of claim 1, wherein the communication device comprises a memory for storing a look-up table, the look-up table including the estimates of power consumption for each of the at least two communication systems for different operating parameters.

7. The method of claim 1, wherein the determining and selecting steps are performed by the communication device when the communication device enters the idle mode of operation or when a communication system becomes available to the communication device for communication.

8. The method of claim 1, wherein one of the at least two communication systems is a preferred communication system for the communication device in an active mode of operation.

9. The method of claim 8, wherein in an active mode of operation, the communication device is allocated communication resources and communicates with a communication system to transmit or receive traffic information.

10. The method of claim 1, wherein in an idle mode of operation, the communication device receives signaling information from a communication system and no communication resources are allocated to the communication device for transmitting or receiving traffic information.

11. The method of claim 8, further comprising establishing communication with the preferred communication system when traffic information is to be received by or transmitted from the communication device in the active mode of operation.

12. The method of claim 11, when the preferred communication system is different from the determined communication system, the establishing step comprises the communication device registering with the preferred communication system for communication.

13. A communication device capable of operating with at least two communication systems, the communication device comprising:
    a communication section for providing wireless communication with the at least two communication systems; and
    a processing unit coupled to the communication section, the processing unit being arranged in operation to:
        determine the one communication system of the at least two communication systems with which the communication device has a smallest power consumption when operating in an idle mode of operation; determine operating parameters for each of the at least two communication systems, the operating parameters defining operation of the communication device with each of the at least two communication systems during the idle mode of operation; determine estimates of power consumption of the communication device when operating with each of the at least two communication systems during the idle mode of operation based on the determined operating parameters; and determine the communication system for which the determined estimate of power consumption of the communication device is the smallest; and
        select the determined one communication system for operation with the communication device during the idle mode of operation.

14. The communication device of claim 13, wherein the operating parameters include system parameters received by the communication device from the at least two communication systems.

15. The communication device of claim 13, wherein the operating parameters further include device parameters corresponding to a configuration of the communication device.

16. The communication device of claim 13, further comprising a memory for storing a look-up table, the look-up table including the estimates of power consumption for each of the at least two communication systems for different operating parameters.

* * * * *